United States Patent [19]
Lieser

[11] 3,715,956
[45] Feb. 13, 1973

[54] MACHINE TOOL FOR CUTTING LONGITUDINAL GROOVE IN CYLINDRICAL WORK PIECE

[75] Inventor: Karl Lieser, Wuppertal-Elberfeld, Germany

[73] Assignee: Firma Hermann Werner, Wuppertal-Hahnerberg, Germany

[22] Filed: April 24, 1970

[21] Appl. No.: 31,616

[30] Foreign Application Priority Data

April 26, 1969 Germany.....................P 19 21 514.6

[52] U.S. Cl..........................90/20, 90/3, 90/21 R, 82/18
[51] Int. Cl...............................................B23c 3/28
[58] Field of Search..........90/21, 20, 11.62, 11 R, 3, 90/15, DIG. 4, 9, 5; 82/18

[56] References Cited

UNITED STATES PATENTS

| | | | |
|---|---|---|---|
| 2,622,484 | 12/1952 | Birrell | 90/3 |
| 3,301,135 | 1/1967 | Jenkins | 90/15 |
| 1,485,687 | 3/1924 | Melling | 90/11 R X |

*Primary Examiner*—Gil Weidenfeld
*Attorney*—Ernest G. Montague

[57] ABSTRACT

A machine tool for forming longitudinal grooves in a cone apex of cross slot-engine lathes or similarly designed work pieces, and retaining a work piece in a clamping chuck, and a rotating cutter tool. The latter cuts into the work piece in longitudinal direction of the latter. The cutter tool comprises a fly cutter. Means are provided for continuous rotation of the work piece. The cutter tool cuts into the work piece.

8 Claims, 10 Drawing Figures

MACHINE TOOL FOR CUTTING LONGITUDINAL GROOVE IN CYLINDRICAL WORK PIECE

The present invention relates to a machine tool for cutting longitudinal grooves in the apex of a cone of cross slot-engine lathes or similar design work pieces.

It is known to work the grooves in the apex of the cone in the shaft of an engine lathe by means of a profile cutter of conventional design. One uses thereby a machine tool in which the work piece is retained in a clamping chuck and the rotating cutter enters, in the longitudinal direction of the clamped work piece, into the latter, whereby the work piece to be formed with a plurality of grooves is set-off, stepwise upon finishing one groove, for the angle of a groove pitch. A multiple advance and return is thus necessary, so that the working time period is unfavorably long.

It is one object of the present invention, to provide a machine tool which permits a time period for the cutting which is reduced to an appreciable extent, and which machine tool assures with an automatic control working procedure, a more precise of the working.

It is another object of the present invention, to provide a machine tool wherein a cutter, formed as a fly cutter, cuts into the continuously and rotatingly driven work piece.

In accordance with the present invention, the rotation of the clamping chuck and of the cutter head can be made adjustable by a common control drive.

Furthermore, in accordance with the present invention, the advance of the clamping chuck can be branched-off from the same control drive, so that a simple structure results.

In order to obtain a high cutting output by the fly cutter, in accordance with the present invention, a substantially triangular cross-section profile of the fly cutter is provided which is narrower than the cross-section of the grooves to be produced.

In accordance with the present invention, the clamping chuck is provided on a slide controlled by a cam disc, and the jaws thereof are controllable, against spring forces which bias the chuck into the clamping position, by means of hydraulically or pneumatically operated knee levers, for releasing the chuck, and thereby additionally a rapid work piece change is obtained.

The advantages of the design of the present invention resides in the first place in the fact, that due to the continuous work piece rotation, the grooves as well as their pitch distance are worked exactly to the highest degree. Furthermore, the working of the work pieces consisting mostly of high alloy steels is more favorable by the fly cutter. One can increase the chip removal; one can obtain high cutting speeds; and one can save on tool costs. The structure of the machine tool of this type is less cumbersome, extremely reliable in operation, and free from disturbances, so that a simple automation of the working procedure can be performed easily.

With these and other objects in view, which will become apparent in the following detailed description, the present invention, which is disclosed by example only, will be clearly understood in connection with the accompanying drawings, in which.

Figure 1:
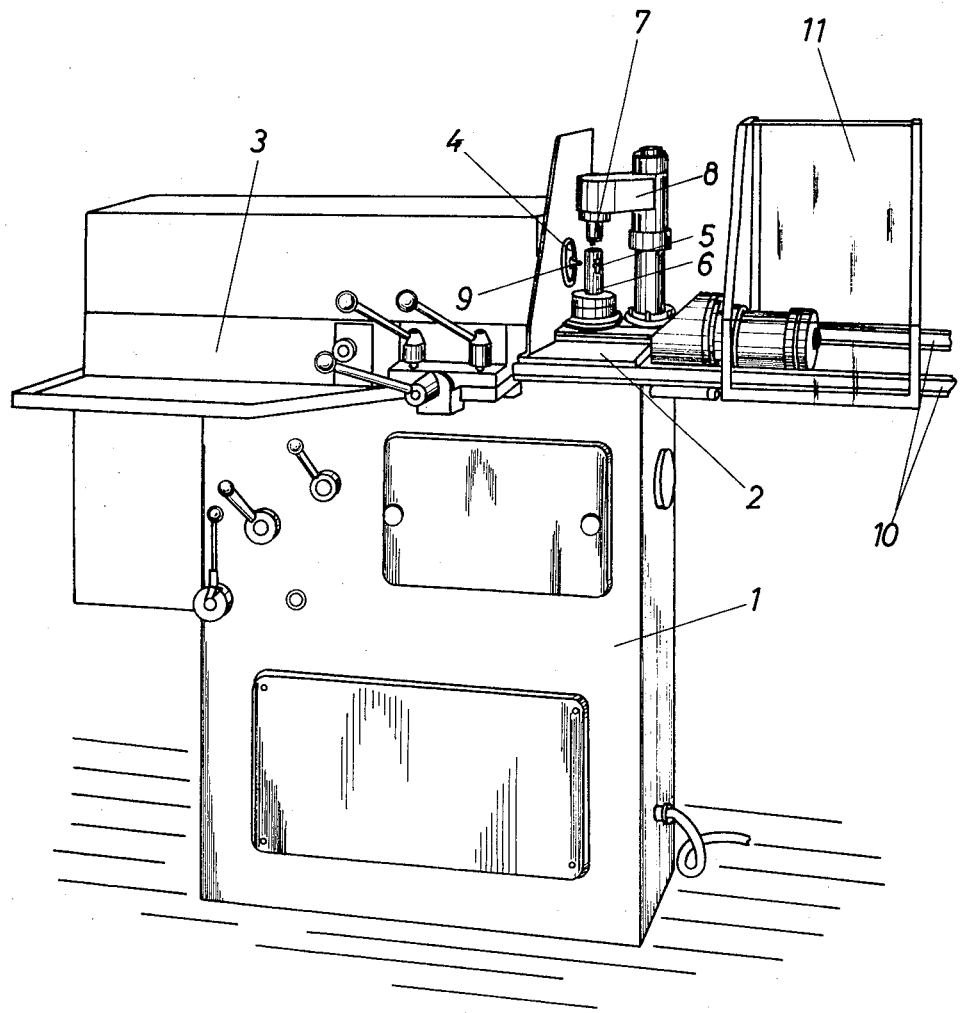
FIG. 1 is a perspective front view of a machine tool, designed in accordance with the present invention.
Figure 2:
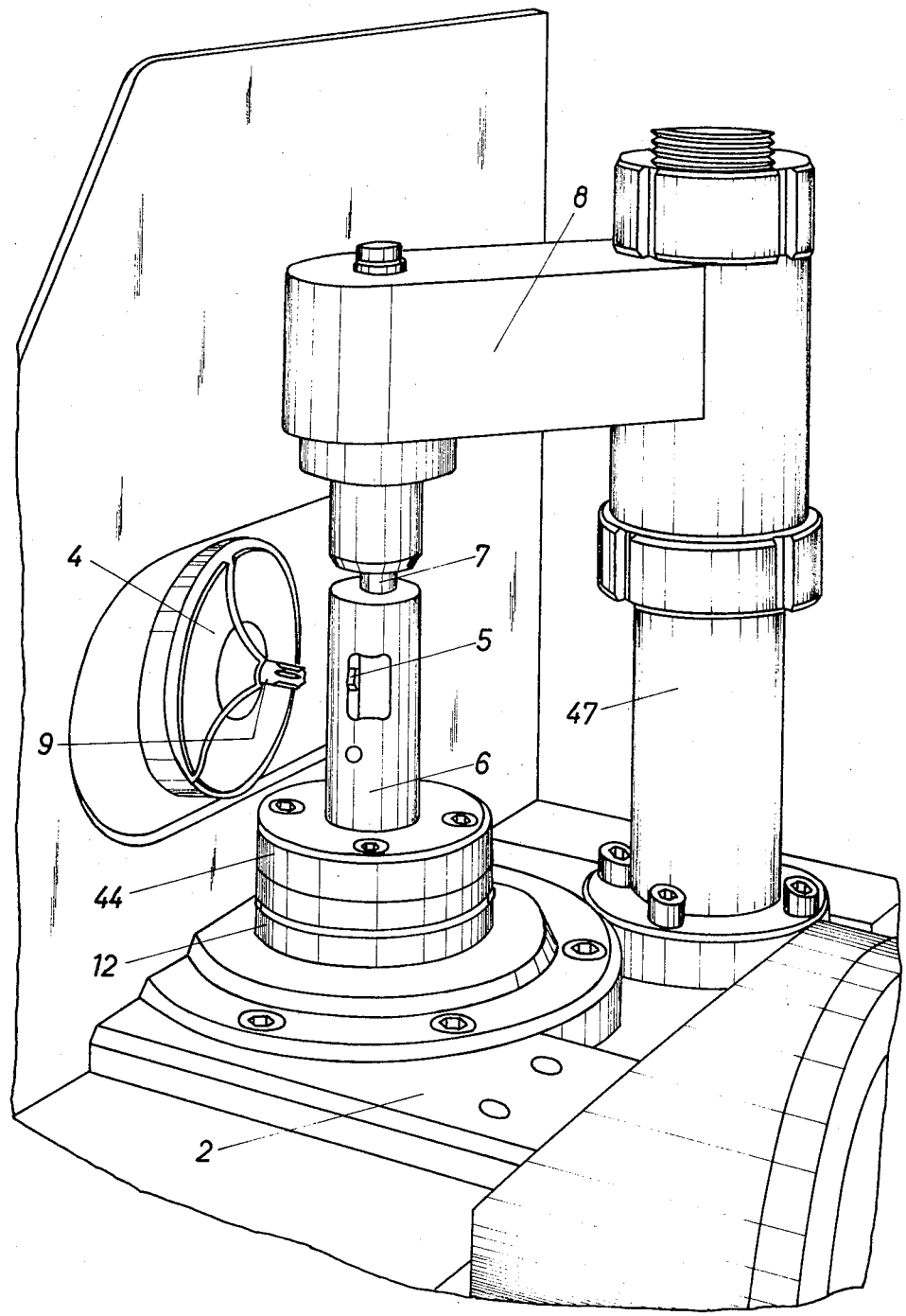
FIG. 2 is a perspective end view, shown at an enlarged scale.
Figure 3:
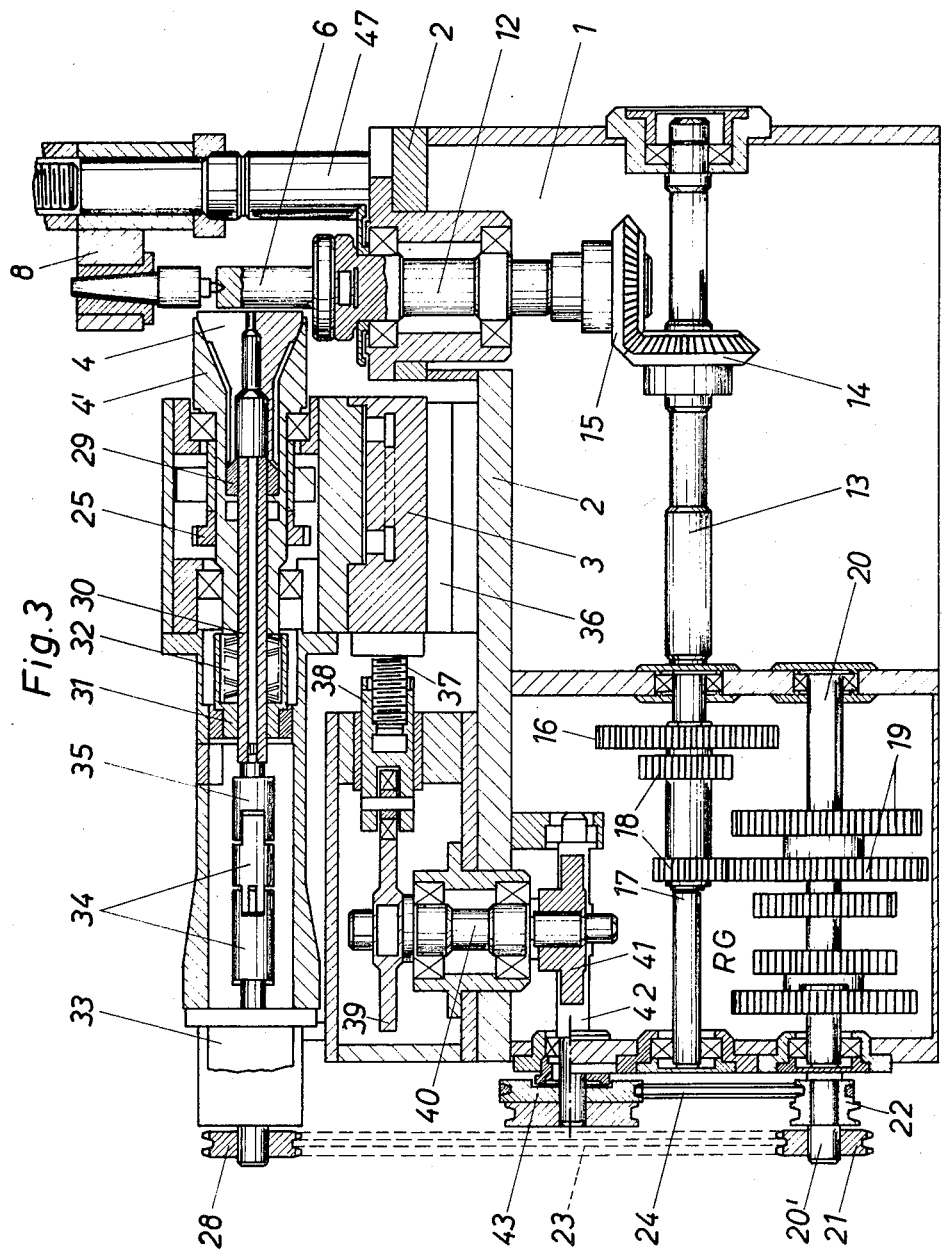
FIG. 3 is a vertical longitudinal section of the machine tool, extending in the plane of the clamping chuck.

Referring now to the drawings, the machine tool comprises a box type stand 1, in which the control drive RG, to be discussed below, is contained, and which carries on a table face 2, guided for longitudinal displacement, a support 3 including a clamping chuck 4. At the fore-end of the table face 2, the cutter head 6 carrying the fly cutter 5 is rotatably mounted. The cutter head 6 is supported by a centering point 7, which is retained in an immovable tailstock.

Suitable grooves are worked in the cone-apex of a work piece 9 for the known cross slot-engine lathes, and the work piece is retained clamped in the clamping chuck 4.

A transparent protecting hood 11 displaceable on rails 10 serves to cover the working against flying chips.

The support 3 including the clamping chuck 4, is reciprocable on the table face 2. The clamping chuck 4 is continuously rotatingly driven. Likewise, the cutter head 6 is also continuously rotatingly driven by means of the cutter shaft 12, and in particular, forcibly, by means of the drive RG contained in the box type stand 1. The main shaft 13 of the drive carries for this purpose a bevel gear 14, which meshes with the bevel gear 15 on the cutter shaft 12. The main shaft 13 of the drive is in rigid connection with an intermediate shaft 17 of a switchable control drive by means of a pair of spur gears 16, the step gears 18 of which control drive are in mesh by means of a pair of sliding gears 19 of an auxiliary shaft 20. Additional step gears serve the purpose of obtaining a greater number of transmissions.

On a driven shaft 20', which extends parallel with the auxiliary shaft 20 and is driven by the latter, belt pulleys 21 and 22 are secured, which provide by means of chains 23 and 24, respectively, or V-belts, a driving connection to the clamping chuck 4 and to the support 3.

Figure 4:
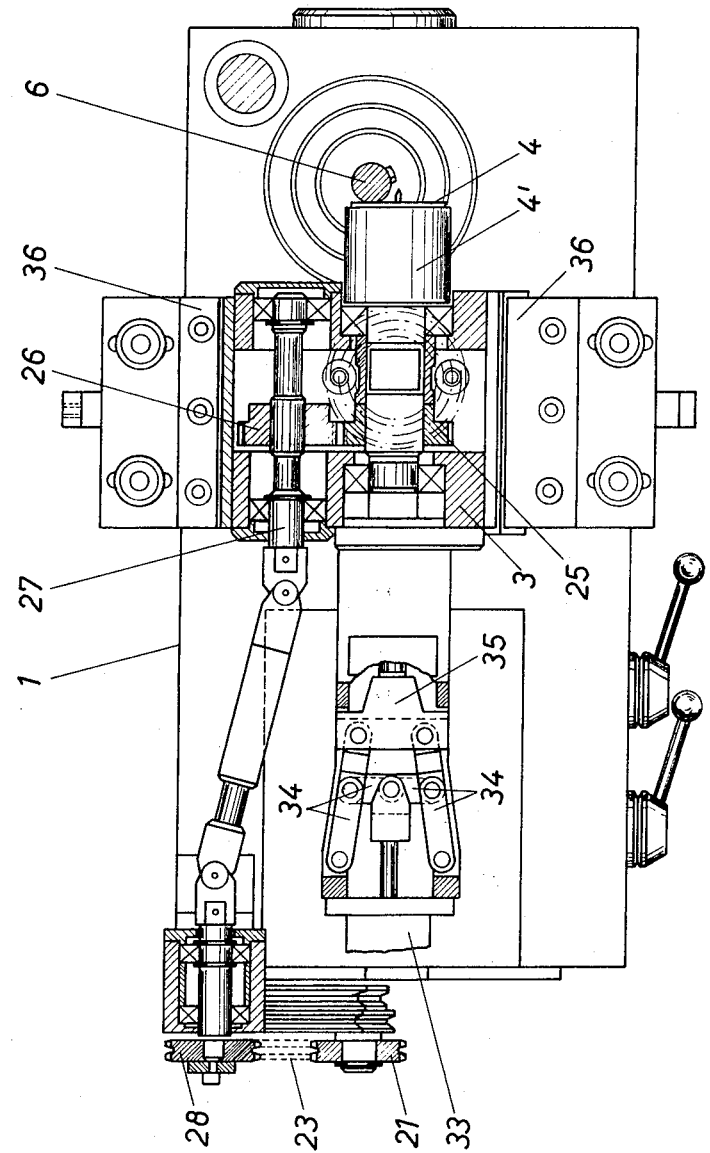
FIG. 4 is a horizontal section extending in the central plane of the support carrying the clamping chuck.

A bushing 4' of the clamping chuck 4 formed with a shaft is rotatably mounted on the support 3 and carries a toothed gear 25, which (as shown in FIG. 4) meshes with a toothed gear 26, which sits on the drive shaft 27. The drive shaft 27 is telescopically expandable and formed as a cardan joint. It carries at its free end, a chain wheel 28, on which runs the chain 23 and transmits a rotary drive.

The jaws of the clamping chuck 4 designed in form of clamping tongues have an extended socket projection 29 which is equipped with a thread and in which a control rod 30 is screwed in. Between a spring plate 31 carried by the latter and the shaft end of the bushing 4' sits a set of plate springs 32 under pre-tension. The latter causes by its pressure force the clamping of the jaws of the clamping chuck by pulling the conical faces thereof into the bushing 4'.

In an axial arrangement of the clamping chuck 4 there is provided a hydraulic cylinder 33, the piston rod of which acts upon a double pair of knee levers 34, the end piece 35 of which abuts the control rod 30. Upon operation of the cylinder 33, the jaws of the clamping chuck are released by the pressure force pushing out from the bushing 4'.

The support 3 carrying the clamping chuck 4 is displaceably mounted in a prism guide 36 on the upper plate 2' of the box type stand 1. A pin end 37 of the support 3 enters a ram 38, the roller of which engages a cam disc 39. The latter transmits by its rotation, the advance of the clamping chuck and of the work piece clamped therein during the operation of the fly cutter. The cam disc 39 is provided on a shaft 40, which is mounted in the plate 2' and carries a worm wheel 41 which engages the worm on the shaft 42. The shaft 42 has a pulley 43 on which runs the V-belt 24, driving the cam disc 39.

Figure 7:
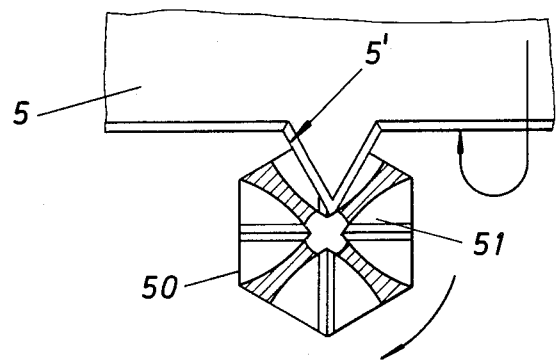
FIG. 7 is a schematic end view of the work piece indicating the fly cutter engagement.
Figure 8:
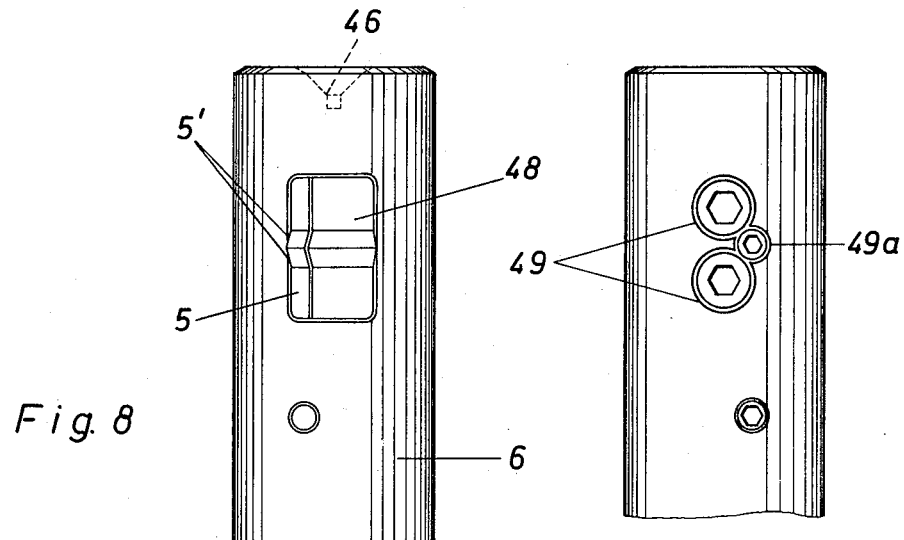
FIG. 8 is a longitudinal plan view of the cutter head.
Figure 9:
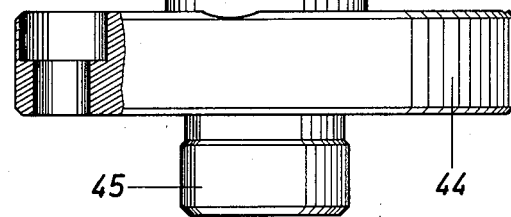
FIG. 9 is a bottom plan view thereto.
Figure 10:
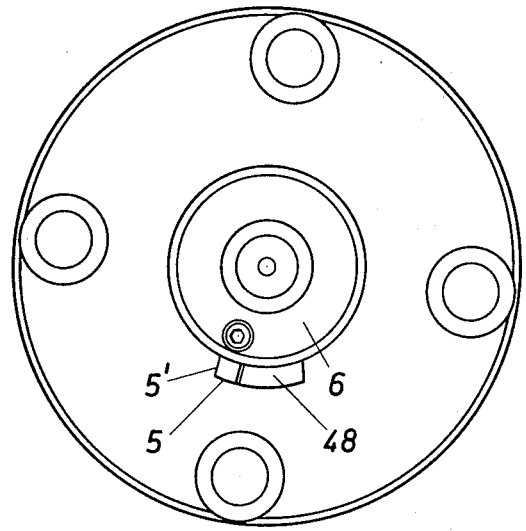
FIG. 10 is an end view of the showing in FIG. 8.

The fly cutter 5 (FIGS. 8 – 10) is disposed in a cutter head 6. The latter is rigidly connectable by its flange 44 with a cutter shaft 12. An exact centering of the cutter head 6 takes place by a centering pin 45 fittingly entering the cutter shaft and by a center drill 46, provided at the upper end, into which center drill 46 enters the center point 7 of the pinole 8. The latter is carried by a strong immovable holding column 47. The fly cutter 5 comprises a high speed plate with an edge 5' of substantially triangular cross-section-profile (FIG. 7). This profile is dimensioned corresponding with the desired groove profile, whereby it is taken into consideration, that from the entrance up to the removal of the cutter a rotation of the work piece takes place; thus the profile must be also smaller than the full groove cross-section. For setting, adjustment and after-positioning, the fly cutter is lined by a supporting tooth 48, which permits by means of a set screw 49a the required adjustment. It is fixed by clamping screws.

Figure 5:
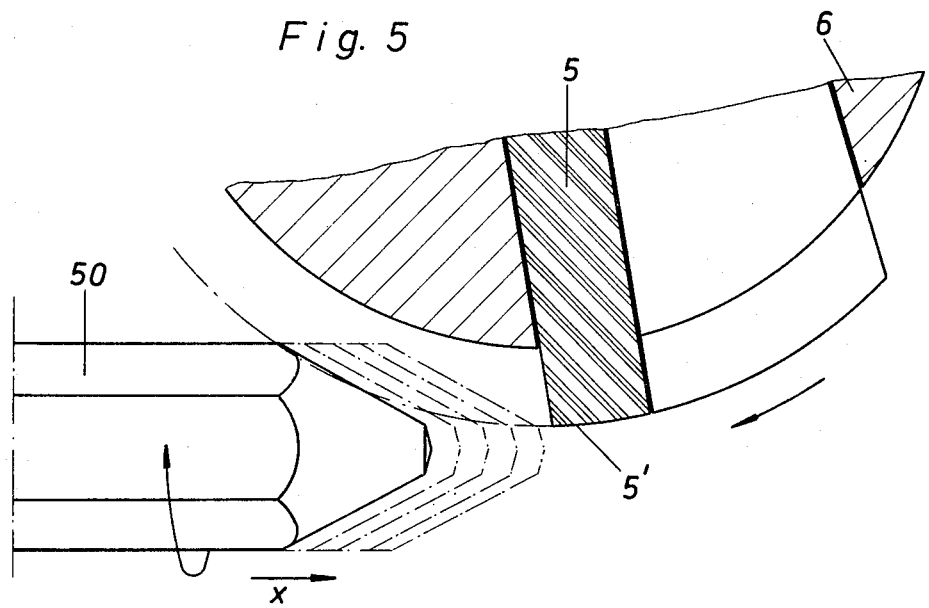
FIG. 5 is a schematic presentation of the cutter indicating the cutter working step of the first cut of the work piece.

The operation of the described machine tool for the working of longitudinal grooves within the range of the apex of the cone of a work piece will now be explained in connection with FIGS. 5–7 of the drawings:

The work piece change is performed while the protection hood 11 (FIG. 1) is in open position. The work piece 9 comprises a bolt or shaft which is forcibly inserted into and withdrawn from, respectively, the receiving cavity of the jaws of the clamping chuck 4. A suitably provided automatic program circuit performs the machine control. For the start of the latter, the protection hood is to be closed and a starting switch is to be operated. By this operation, the joint control drive RG is started. The cutter shaft 12 is driven with a number of revolutions "$n$." Simultaneously, the clamping chuck 4 is tightened and is put into a continuous rotation "$n^x$" by means of the chain drive 21, 23 and 28 and the drive shaft 27 in addition to the gear transmission 25 and 26, which continued rotation "$n^x$" is sychronous with the cutter shaft 12, however, at a ratio corresponding with the desired number of grooves (in the shown example 1:4).

By the cam disc 39, the support 3 is moved in a direction towards the cutter head 6, likewise in synchronism, by the belt drive 22 and 24, and in particular so far that the working-in of the grooves into the work piece 50 takes place. As schematically shown in FIGS. 5, 6 and 7, the working of the edge 5' of the fly cutter 5 on the conical face of the work piece 50 begins its cutting insertion during the working, and deepens the cut with progressing advance, whereby the work piece rotation during the cutter engagement, produces a cross-section of the groove 51, as seen in FIG. 7.

By the continuous and ratio-synchronous rotation of the work piece 50, during each rotation successively each of the grooves 51, for example, four grooves, is cut. As it is shown in FIG. 5, at first the cutter point of the triangular fly cutter 5 cuts on the conical jacket face and immerses deeper, as long as a stroke takes place in the direction of the arrow $x$. This makes possible a favorable chip formation and a free cutting of the cutter, so that the highest cutting speeds are applicable.

Figure 6:
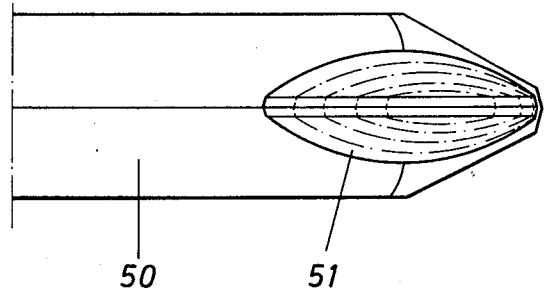
FIG. 6 is a top plan view of the showing in FIG. 5.

The dotted-dashed line curves of the grooves in FIG. 6 indicate the expansion of the groove cut within the range of the conical point upon advance during the working-in. In this figure, also the finished form of the groove is recognizable on a four grooved cross-slot-engine lathe. The cross ribs remaining between the grooves constitute precisely coinciding drives as to form and position, which must enter exactly into the slots of the screw head.

Instead of the illustrated shaft end of a cross slot-engine lathe, similarly formed work pieces can be produced for other purposes, by example, inserts for ratched-like engine lathes, under circumstances also with a greater number of grooves. Likewise the length of the grooves and the cone point can be varied.

While I have disclosed several embodiments of the present invention, it is to be understood that these embodiments are given by example only and not in a limiting sense.

I claim:

1. A machine tool for cutting longitudinal grooves having the configuration of a cone apex on a cylindrical work piece, comprising chuck means for clamping the work piece therein, means supporting said chuck means for rotation about an axis, means mounting a cutting tool for rotation about an axis substantially normal to the rotational axis of said chuck means, said cutting tool comprising a fly cutter extending into the path of the work piece, joint control means for rotating said chuck means and said cutting tool, said joint control means rotating said cutter tool at a predetermined rate proportional to the rotational speed of said chuck means, and means associated with said joint control drive means for providing relative movement between the chuck means and the cutting tool in the direction of the rotational axis of said chuck means, whereby said longitudinal grooves are cut into said work piece.

2. The cutting machine, as set forth in claim 1, wherein said means associated with said control drive means advances said chuck means toward said cutting tool.

3. The machine tool, as set forth in claim 1, wherein said fly cutter has a substantially triangular cross-section-profile and is narrower than the cross-section of the grooves to be produced in said cone apex, said clamping chuck including jaws for holding said work piece, said means for providing relative movement between said chuck means and said cutting tool including a slide member supporting said clamping means for movement towards said cutting tool and a cam disc cooperating with said slide member for controlling the movement thereof, spring means for urging said jaws into a work piece clamping position, and hydraulically operated knee lever means for controlling said jaws into a releasing position.

4. A cutting machine for cutting grooves having the configuration of a cone apex on a work piece, comprising a chuck means for releasably retaining said work piece projecting from said chuck means, means supporting said chuck means for rotation about an axis, means mounting a cutting tool means for rotation about an axis sub-stantially normal to the rotational axis of said chuck means, means for rotating said cutting tool means at a predetermined rate proportional to the rotational speed of said chuck means, said cutting tool means comprising a single knife extending into the path of said work piece, said knife being triangular in cross-section and defining a knife edge, and said means for rotating said cutting tool displacing said knife edge during a portion of said rotation thereof in the direction of the rotational axis of said chuck means into cutting engagement with said work piece while the latter is continuously rotated, whereby successive profile cuts widen said grooves into said cone apex.

5. The cutting machine, as set forth in claim 4, wherein said knife edge constitutes a pointed edge of said triangular cross-section of the knife and said triangular cross-section is narrower than the profile of the grooves to be worked into said cone apex.

6. The cutting machine, as set forth in claim 4, wherein said means for rotating said cutting tool means includes a cutter shaft on which said cutting tool means is secured, a main shaft disposed at a right angle to said cutter shaft and drivingly connected thereto, a slide, said chuck means constituting a clamping means for releasably retaining a rod-like work piece, said means supporting said chuck means mounted on said slide, step drive gear means operatively connected to said main shaft for rotating said means supporting said chuck means and said work piece such as to provide a selectively variable continuous rotation of said cutting tool relative to the continuous rotation of said work piece.

7. The cutting tool, as set forth in claim 4, wherein said means for rotating said cutting tool means includes a cutter shaft on which said cutting tool means is secured, a main shaft disposed at a right angle to said cutter shaft and drivingly connected thereto, a slide on which said means supporting said chuck means is disposed, a cam means for longitudinally displacing said means supporting said chuck means, said chuck means having inner clamping members, spring means for biasing said inner clamping members into a clamping locking position for retaining said work piece, and hydraulically operated knee lever means for moving said inner clamping members against the force of said spring means into a releasing position.

8. The cutting machine, as set forth in claim 4, further comprising a slide on which said means supporting said chuck means is disposed, said slide disposed for movement parallel to the direction of the rotational axis of said chuck means, said means supporting said chuck means and said means for rotating said cutting tool constitute a control drive means including transmission step gears, and separate drive means for moving said slide.

* * * * *